United States Patent [19]

Dong et al.

[11] Patent Number: 5,093,912

[45] Date of Patent: Mar. 3, 1992

[54] DYNAMIC RESOURCE POOL EXPANSION AND CONTRACTION IN MULTIPROCESSING ENVIRONMENTS

[75] Inventors: Margaret A. Dong; Richard K. Treiber, both of San Jose, Calif.

[73] Assignee: International Business Machines Corporation, Armonk, N.Y.

[21] Appl. No.: 371,563

[22] Filed: Jun. 26, 1989

[51] Int. Cl.⁵ ............................................ G06F 12/00
[52] U.S. Cl. ................................ 395/650; 364/230.0; 364/238.6; 364/245.0; 364/245.5; 364/DIG. 1
[58] Field of Search ... 364/200 MS File, 900 MS File

[56] References Cited

U.S. PATENT DOCUMENTS

| | | | |
|---|---|---|---|
| 4,158,235 | 6/1979 | Call et al. | 364/900 |
| 4,422,145 | 12/1983 | Sacco et al. | 364/300 |
| 4,720,850 | 1/1988 | Oberlander et al. | 379/90 |
| 4,727,487 | 2/1988 | Masui et al. | 364/300 |
| 4,747,130 | 5/1988 | Ho | 364/200 |
| 4,807,111 | 2/1989 | Cohen et al. | 364/200 |
| 4,847,754 | 7/1989 | Obermarck et al. | 364/200 |
| 4,939,644 | 7/1990 | Harrington et al. | 364/200 |
| 5,034,993 | 7/1991 | Sasuta et al. | 455/11 |

OTHER PUBLICATIONS

IBM System/370, Extended Architecture, "Principles of Operation," Publication No. SA22-7085-1, File No. S370-01.

MVS/Extended Architecture Supervisor Services and Macro Instructions, "Program Product", File No. S370-36, JES3 Version 2-5665-291, JES2 Version 2-5740-XC6.

*Primary Examiner*—Thomas C. Lee
*Assistant Examiner*—William M. Treat
*Attorney, Agent, or Firm*—Pryor A. Garnett; Bo-In Lin

[57] ABSTRACT

A method for expanding and contracting a resource pool dynamically, i.e. in response to demand for the resources, is disclosed. Resources are allocated for use from a single master pool 22. The overall pool of available resources is expanded by creating an extension pool and adding its resources to the master pool. The master pool can theoretically be expanded to the limits of the number of resources available in the system.

To contract the pool dynamically, first one of the extension pools is selected to be freed (FREE_POOL 66). Those resources owned by the freed pool but still in the master pool (i.e., not in use) are moved to the extension pool, preventing their reuse. Resources in use which are owned by the freed pool are labeled by changing their home address 52 so that they will be returned to the extension pool instead of to the master pool. Once all such resources have been returned to the freed extension pool it is deleted, thereby contracting the overall pool of resources.

Pseudocode implementations of the procedures for manipulating storage buffers and buffer pools are included.

10 Claims, 14 Drawing Sheets

*MASTER AND EXTENSION BUFFER POOLS*

MASTER AND EXTENSION BUFFER POOLS

SINGLE BUFFER POOL

```
      DECLARE
310   1 ANCHOR,           /= Anchor Block =/
311       2 MASTER    POINTER(31),
                          /= Address of Master Pool Control =/
312       2 FREE_EXT,     /= List of freed extensions =/
313           3 CDS_INDEX   FIXED(32),
                          /= Index to ensure CDS correctness =/
314           3 FREED     POINTER(31),
                          /= Freed Pool Control Element List =/

DECLARE
320   1 POOL_CTL,        /= Pool control element 28 =/
321       2 NEXT_EXT,    /= List of Extension Pool =/
322           3 CDS_INDEX   FIXED(32),
                          /= Index to ensure CDS correctness =/
323           3 NEXT_POOL  POINTER(31),
                          /= Address of next POOL_CTL L =/
324       2 FREE,        /= List of free buffers =/
325           3 CDS_INDEX   FIXED(16),
                          /= Index to ensure CDS correctness =/
326           3 BUSY_CT    FIXED(16),
                          /= Count of buffers removed =/
327           3 FIRST_FREE  POINTER(31),
                          /= Addr of first free BUF_CTL or 0 =/
328       2 STOPOVER,    /= Temporary free buf list (Master) =/
329           3 CDS_INDEX   FIXED(16),
                          /= Index to ensure CDS correctness =/
330           3 BUSY_CT    FIXED(16),
                          /= Count of buffers removed =/
331           3 FIRST_FREE  POINTER(31),
                          /= Addr of first free BUF_CTL or 0 =/
332       2 FIRST_OWNED   POINTER(31),
                          /= Address of first owned BUF_CTL =/
332a      2 FLUSH_CT    FIXED(31)
                          /= Number of buffers flushed from
                             master to extension's free list =/
      ...

DECLARE
340   1 BUF_CTL,         /= Buffer control element 30 =/
341       2 BUFFER_ADDR   POINTER(31),
                          /= Address of associated buffer =/
342       2 HOME_POOL    POINTER(31),
                          /= Address of POOL_CTL to which buffers
                             are to be returned =/
343       2 NEXT_FREE    POINTER(31),
                          /= Address of next free BUF_CTL =/
344       2 NEXT_OWNED   POINTER(31),
                          /= Address of next owned BUF_CTL =/
      ...
```

DATA STRUCTURE DEFINITIONS

FIG. 3.

```
400  Acquire storage for the requested number of buffers.
401  Acquire storage for control block area to contain one
     pool_ctl element and one buf_ctl element for each buffer.
402  Place pool_ctl at start of control block area.
403  Place first buf_ctl at location = pool_ctl location +
     LENGTH(pool_ctl) and place each successive buf_ctl at
     location = previous buf_ctl location + LENGTH(buf_ctl).
404  Place first buffer at start of the buffer area and place each
     successive buffer at location = previous buffer location +
     LENGTH(buffer).

405  DO for each of the buf_ctl elements.

/* Allocate a buffer to the buf_ctl element */
406     SET buf_ctl.buffer_addr = current buffer location.

/* Set home pool value -- always the master buffer
        pool */
407     IF master pool requested THEN
408        SET buf_ctl.home_pool = pool_ctl location.
409     ELSE
410        SET buf_ctl.home_pool = anchor.master.

/* Chain buf_ctl element to previous buf_ctl element */
411     IF not the first buf_ctl THEN
412        DO.
413           SET previous buf_ctl.next_free = buf_ctl location.
414           SET previous buf_ctl.next_owned= buf_ctl location.
415        END.
416  END.
     /* Format pool_ctl and add pool to buffer pool structure */
417  SET pool_ctl.first_owned = address of first buf_ctl.
```

BUILD POOL

FIG. 4.A

```
418  IF master pool requested THEN
419     DO.
420        pool_ctl.free.first_free = first buf_ctl location.
421        Use the CS instruction to atomically SET anchor.master
              = pool_ctl location.
422        IF the CS instruction fails THEN
                           /* another process built master pool */
423           DO.
424              Release pool resources.
425              RETURN(failed completion status).
426           END.
427     END.
428  ELSE                 /* extension pool requested */
429     DO.

/* Atomically add extension's entire free buffer list
              to the master free buffer list 40 without updating the
              busy count */
430        ADD_BUFFER_LIST(anchor.master->free, first buf_ctl,
              last buf_ctl, 0).

/* Show all of the extension's buffers have been
              removed */
431        SET pool_ctl.free.busy_ct = number of buffers in
              extension.

/* Atomically add pool_ctl to master pool's extension
              list */
432        ADD_POOL(anchor.master->pool_ctl.next_pool, pool_ctl).
433     END.
434  RETURN(successful completion status).
```

BUILD POOL

FIG. 4B

```
500  Obtain access to master pool from anchor.master.

/= Try to remove a buffer atomically from the master free
     buffer list 40, incrementing the busy count if successful =/
501  REMOVE_BUFFER_AND_COUNT(anchor.master->free, buf_ctl).
502  IF a buf_ctl was removed from the free buffer list THEN
503      RETURN (successful completion status, location of
         buf_ctl).
504  ELSE                  /= master free buffer list 40 is empty =/
505      DO.
         /= Try to remove a buffer atomically from the master
         pool's stopover list, incrementing the busy count if
         successful =/
506      REMOVE_BUFFER_AND_COUNT(anchor.master->stopover,
         buf_ctl).
507      IF a buf_ctl was removed from the stopover list THEN
508          RETURN (successful completion status, location of
             buf_ctl).
509      ELSE
510          RETURN (failed completion status, NULL pointer).
511      END.
```

GET BUFFER
FIG. 5.

```
600  Obtain pool_ctl from buf_ctl.home_pool.

/= Atomically add buf_ctl to the appropriate free buffer list
     and decrement the busy count =/
601  ADD_BUFFER_AND_COUNT(pool_ctl.free, buf_ctl).
602  RETURN.
```

FREE BUFFER
FIG. 6.

```
700   REMOVE_POOL(anchor.master->pool_ctl.next_ext, pool_ctl).
                      /* atomically remove first extension
                         pool, if there is one */
701   IF a pool_ctl element was removed THEN
702       DO.
              /* Reset home pool for each buf_ctl owned by
                 extension */
703       DO for each buf_ctl in pool_ctl.first_owned list.
704           SET buf_ctl.home_pool = pool_ctl location.
705       END.
              /* Remove all of the extension's buf_ctl elements that
                 are on the master free buffer list */
706       FLUSH_MASTER_POOL(pool_ctl).
              /* Check if the extension is now quiesced */
707       IF pool_ctl.free.busy_ct = 0 THEN
                      /* pool is quiesced */
707a          DO.
708               Release pool resources.
708a              RETRY7:
709                   Use the CS instruction to atomically
                      decrement anchor.master->free.busy_ct by the
                      number of extension buffers that user
                      processes have removed from the master free
                      buffer list but returned to the extension
                      (i.e., the number of extension buffers minus
                      pool_ctl.flush_ct).
709a                  If the CS instruction fails then
709b                      GOTO RETRY7.
709c          END.
710       ELSE       /* some of the extension's buffers are
                        being used */

/* Atomically add pool_ctl to the master freed pool
                 list 72 */
711           ADD_POOL(anchor.free_ext.freed, pool_ctl).
712       END.
                         FREE POOL
                         FIG. 7.
```

```
800  FLUSH_MASTER_POOL(element: pool_ctl element).
801      Get free_pool latch.
802      removeloop:
             /* Remove all freed extension buf_ctl elements from
             the master free buffer list 40 */
803          DO forever.
             /* Atomically remove the first free buffer from the
             master free buffer list 40 and increment the busy
             count by one (1) */
804              REMOVE_BUFFER_AND_COUNT(anchor.master->free,
                 buf_ctl).
805              IF a buf_ctl element was removed THEN
806                  DO.
807                      IF buf_ctl.home_pool is not equal to
                         anchor.master THEN
                             /* Atomically add buf_ctl to extension's
                             free buffer list, decrementing the busy
                             count by one (1) */
808                          ADD_BUFFER_AND_COUNT(pool_ctl.free,
                             buf_ctl).
809                      ELSE
                             /* Add buf_ctl to master pool's stopover
                             list without altering the busy count */
810                          ADD_BUFFER(anchor.master->
                             pool_ctl.stopover, buf_ctl).
811                  END.
812              ELSE       /* no buf_ctl element was removed */
813                  LEAVE removeloop.
814              IF pool_ctl element was passed as input parm THEN
815                  IF pool_ctl.free.busy_ct = 0 THEN
816                      LEAVE removeloop.
817          END DO forever.
```

FLUSH MASTER POOL

FIG. 8.A

```
818     Returnloop:
            /= Remove buf_ctl elements from the master pool's
            stopover list and return then to the master free
            buffer list 40 =/
819         DO forever.
                /= Atomically remove a buffer from the master
                pool's stopover list without altering the busy
                count =/
820             REMOVE_BUFFER(anchor.master->pool_ctl.stopover,
                buf_ctl).
821             IF a buf_ctl element was removed THEN
                    /= Atomically add buf_ctl to master free buffer
                    list 40, decrementing the busy count by one
                    (1) =/
822                 ADD_BUFFER_AND_COUNT(anchor.master->free,
                    buf_ctl).
823             ELSE    /= no buf_ctl element was removed =/
824                 LEAVE returnloop.
825         END DO forever.
826     Release free_pool latch.
        /= extension buffers that are removed will never be
        returned to the master free buffer list 40, so must
        adjust the busy_ct =/
826a    RETRY8.
827        Use the CS instruction to atomically decrement
           anchor.master->free.busy_ct by the number of extension
           buffers removed from the master list.
827a       If the CS instruction fails then
827b          GOTO RETRY8.
828     Increment pool_ctl.flush_ct by the number of such
        buffers.
829 END FLUSH_MASTER_POOL.
```

FLUSH MASTER POOL

FIG. 8B

```
900  DO WHILE freed extension list is not empty.
901      Set timer and wait for time interval to expire.
         /* When timer has expired, perform timer-driven
         actions */
902      rescan:
         /* Scan the entire freed extension list for pools that
         can be deleted because they have quiesced */
903      DO for each pool_ctl on freed extension list.
904          IF pool_ctl.busy_ct = 0 THEN
                     /* pool is quiesced */
905              DO.
                     /* Only one process removes pools from the
                     freed extension list, so it is safe to remove
                     from anywhere in the list */
906              IF first pool_ctl on list THEN
907                  UNCHAIN_POOL(anchor.free_ext, pool_ctl,
                         fail).
908              ELSE
909                  UNCHAIN_POOL(previous pool_ctl.next_ext,
                         pool_ctl, fail).
910              IF fail = ON  THEN
                     /* a parallel process has altered the
                     freed extension list, so must rescan the
                     entire list */
911                  GOTO rescan.
912              Release pool resources.
912a             RETRY9.
913                  Use the CS instruction to atomically
                     decrement anchor.master-> free.busy_ct by
                     the number of extension buffers that user
                     processes have removed from the master free
                     buffer list but returned to the extension
                     (i.e., the number of extension buffers minus
                     pool_ctl.flush_ct).
913a                 If the CS instruction fails then
913b                     GOTO RETRY9.
914              END.
915      END DO for each pool_ctl on freed extension list.
916      IF "sufficiently many" timer intervals have transpired
         THEN
917          DO.
918              FLUSH_MASTER_POOL(NULL pool_ctl).
919              GOTO rescan.
920          END.
921  END WHILE freed extension list is not empty.
```

DELETE POOL

FIG. 9.

```
1000 ADD_POOL(header: pointer, element: pool_ctl element).
1001    VAR old_header: pointer.
1002       retry10:
1003          SET old_header = header. /* save header to check if
                   another process has reset the header */
1004          SET element.next_pool = old_header. /* chain old
                   header to the new element */
1005          Use CS instruction to atomically SET header = element.
1006          If the CS instruction fails /* header was reset in
                   parallel so that old_header and header are now
                   different */
1007             GOTO retry10. /* try to add element to new list
                       header */
1008 END ADD_POOL.
```

ADD POOL
FIG. 10.

```
1100 TYPE
1101    poolchain =
1102       structure
1103          index : fixed(32).
1104          chain: pointer.
1105       end.

1106 REMOVE_POOL(anchor: poolchain, element: pool_ctl element).
1107    retry11:
             /* Atomically remove first pool_ctl element on list */
1108       UNCHAIN_POOL(anchor, element, fail).
1109       IF fail = ON THEN
                         /* atomic operation failed */
1110          GOTO retry11.
1111       ELSE          /* atomic operation did not fail */
1112          RETURN(element).
                         /* return NULL or removed pool_ctl */
1113 END REMOVE_POOL.
```

REMOVE POOL
FIG. 11.

```
1200 UNCHAIN_POOL(anchor: poolchain, element: pool_ctl element,
     fail: boolean).
1201    VAR old, new: poolchain.
1202       SET fail = OFF.
1203       SET old = anchor /= save anchor to check is another
              process has reset it =/
1204       IF old.chain = NULL pointer THEN /= no chained
              element =/
1205          SET element = NULL. /= show no chained element was
                 removed =/
1206       ELSE /= there is a chained element now, but may be
              removed by parallel processes while unchaining
              actions underway =/
1207          DO.
1208             SET new.index = old.index + 1. /= bump index so
                    that chaining is correct even if more than
                    one process removes elements from the
                    chain =/
1209             SET new.chain = old.chain->next_pool. /=
                    replace the chain field with the next
                    chained element =/
1210             Use CDS instruction to atomically SET anchor =
                    new, thus removing the chained element.
1211             If the CDS instruction succeeds THEN
1212                SET element = old.chain. /= save removed
                       element =/
1213             ELSE /= another process has already reset chain
                    field so that anchor and old poolchains are
                    now different =/
1214                SET fail = ON.
1215          END.
1216       RETURN(element,fail). /= return address of element
              removed if there is one and an indication if the
              atomic operation failed =/
1217 END UNCHAIN_POOL.
```

UNCHAIN POOL

FIG. 12.

```
1300 TYPE
1301     bufheader =
1302         structure
1303             index : fixed(16).
1304             counter : fixed(16).
1305             header : pointer.
1306         end.

1307 ADD_BUFFER_AND_COUNT(anchor: bufheader, element: buf_ctl
     element).
1308     ADD_BUFFER_LIST(anchor, element, element, 1).
1309 END ADD_BUFFER_AND_COUNT.

1310 ADD_BUFFER(anchor: bufheader, element: buf_ctl element).
1311     ADD_BUFFER_LIST(anchor, element, element, 0).
1312 END ADD_BUFFER.

1313 ADD_BUFFER_LIST(anchor: bufheader, element1: buf_ctl element,
     element2: buf_ctl element, n: integer)
1314     VAR old, new: bufheader.
1315         retry13:
1316         SET old = anchor.
                        /= save anchor to check if another
                        process has reset it =/
1317        SET new.index = old.index + 1.
                        /= bump index so that chaining is correct
                        even if more than one process removes
                        elements from the chain =/
1318        SET new.counter = old.counter - n.
                        /= decrement count of previously removed
                        elements =/
1319        SET new.header = element1.
                        /= replace header with first element in
                        the list to be added =/
1320        SET element2->next_free = old.header.
                        /= add existing free buffer list to end
                        of list being added =/
```

ADD BUFFER CONTROL ELEMENTS - PART A

FIG. 13.A

```
1321        Use CDS instruction to atomically SET old = new,
                thus chaining the new element to the list and
                updating both the counter and the index.
1322        If the CDS instruction fails /* anchor was reset in
                parallel so that anchor and old bufheaders are
                now different */
1323           GOTO RETRY13. /* try to add to the new header */
1324 END ADD_BUFFER_LIST.
```

ADD BUFFER CONTROL ELEMENTS - PART B
FIG. 13B

```
1400 REMOVE_BUFFER(anchor: bufheader, element: buf_ctl element).
1401    REMOVE_BUFFER_AND_COUNT(anchor, element, 0).
1402 END REMOVE_BUFFER.

1403 REMOVE_BUFFER_AND_COUNT(anchor: bufheader, element: buf_ctl
     element, n: fixed).
1404    VAR old, new: bufheader.
1405    retry14:
1406       SET old = anchor.
                        /* save anchor to check if another
                        process has reset it */
1407       IF old.header = NULL pointer THEN
                        /* no elements in chain */
1408          SET element = NULL.
                        /* show element was dequeued */
1409       ELSE         /* queue is not empty now, but may be
                        emptied by parallel processes while this
                        processing is doing the 'unchain' */
```

REMOVE buffer control element 30 - PART A
FIG. 14.A

```
1410        DO.
1411            SET new.index = old.index + 1.
                    /= bump index so that chaining is correct
                    even if more than one process removes
                    elements from the chain =/
1412            SET new.counter = old.counter + n.
                    /= bump count of elements removed from
                    chain =/
1413            SET new.header = old.header->next_free.
                    /= make the next element the new list
                    header =/
1414        Use the CDS instruction to atomically SET anchor =
                new, thus removing the first element from the
                chain and updating both the counter and the
                index.
1415        If the CDS instruction succeeds THEN
1416            SET element = old.header. /= save removed
                    element =/
1417        ELSE /= anchor was reset in parallel so that anchor
                and old bufheaders are now different =/
1418            GOTO RETRY14. /= try to add new element to new
                    header =/
1419        END.
1420        RETURN(element). /= return NULL or removed buf_ctl
                element =/
1421 END REMOVE_BUFFER_AND_COUNT.
```

REMOVE buffer control element 30 - PART B

FIG. 14B

DYNAMIC RESOURCE POOL EXPANSION AND CONTRACTION IN MULTIPROCESSING ENVIRONMENTS

BACKGROUND OF THE INVENTION

1. Technical Field

This invention relates to computerized data processing, and more particularly to the management of computer system resources such as buffers in systems where multiple processes are executing concurrently.

2. Technical Background

Multiprocessing: A computer program consists of a sequence of computer instructions and can be executed as a single sequence of instructions or as a set of independent sequences of instructions called "processes". To acquire the use of a computer's resources, the program usually issues requests, called "system calls", to the computer's "operating system". The operating system is a program that manages the use of a computer's resources, such as computer memory or hardware devices. Resources requested by a program are reserved for its exclusive use and are not available for reuse until each is returned to the control of the operating system ("released"). Since system resources are limited and system calls relatively expensive to perform, programs (especially high-volume or high-performance programs) use them in a controlled fashion.

Programs and processes may operate in a number of computer environments. In a "multiprogramming" environment, the execution of two or more programs or processes may be interleaved on one processor. In such a case, a process being executed may be "interrupted"; the computer will stop executing the process and do other work, such as executing another process. It may be some time before the next instruction in the interrupted process is executed. Some processes in this environment may be "disabled" for interrupts. Such processes will not be interrupted and will execute from beginning to end as a sequence.

In a "multiprocessing" environment, the computer consists of more than one processor and each processor may be executing programs or processes in parallel. For example, if a program has two processes, then both may be executing at the same time in a multiprocessing environment. Each processor in a multiprocessor may also be multiprogramming.

Thus, in a multiprocessing environment a process' actions may be interleaved with those of other processes. That process is then said to be executing "concurrently" with the other processes. Also, more than one process may be executing at exactly the same time. Processes executing at the same time on different processors are said to be executing "in parallel".

Serialization: Processes executing concurrently or in parallel may be writing data simultaneously into the same piece of storage, so that one process will destroy what another has written. To prevent errors of this kind, such processes must use one or more "serialization mechanisms" to "serialize" the processes. These mechanisms, some standard and well-known, allow the program to complete critical actions as if they were accomplished by an uninterrupted sequence of instructions, even though the sequence may, in fact, be interrupted at any time. Also, they allow a program to serialize access to a resource so that it is used by only one process at a time. For our purposes, we distinguish between "intrinsic" serialization mechanisms and "extrinsic" serialization mechanisms.

Intrinsic serialization mechanisms are those which involve only "atomic instructions", such as the IBM 370 Compare-and-Swap (CS) or Compare-Double-and-Swap (CDS) instructions. Atomic instructions are computer hardware instructions that are guaranteed to be indivisible. A process executing such an instruction is assured that it can complete the instruction without interference from other processes. Compare-and-Swap, for example, allows a process to update a word of storage safely. The instruction allows a program to note the expected contents of a word in storage and to request that the storage be altered only if the expected contents of the storage matches the current contents when the instruction is executed. The comparison (compare) and alteration (swap) are indivisible actions in the sense that once a process has performed the "compare", no other process can perform the alteration until the associated "swap" is done. The description of these instruction, as well as sample coded applications, can be found in IBM System/370 Extended Architecture Principles of Operation (Publication Number SA22-7085).

Latches: All other serialization mechanisms are said to be "extrinsic". Two basic examples of such are the "spin latch" and the "suspend latch". They involve having a single shared latch variable that is initially set to some null value. To perform an action that is protected by the latch, a process must first "acquire" the latch by successfully setting the latch variable to a non-null value. If the latch variable has already been acquired by another process, the requesting process must wait.

A spin latch is one that causes the requesting process (and processor) to test the variable continously as it waits for the latch to be "released". While this testing takes place the processor is said to be "busy waiting", and cannot do anything else. This type of latch should generally be avoided as it wastes processor time.

A suspend latch, on the other hand, does not require the process to busy wait for the latch if it is already held. Instead, the process "suspends", giving up the processor, until it is awakened ("resumed") by another process (e.g., the operating system) when the latch is available. Although this method is preferable to spin latches, it is nevertheless used with care because of the system overhead associated with keeping track of the suspension and resumption of the requesting process.

For high-performance programs operating in a multiprocessing environment, the choice of serialization mechanisms can be critical. It is useful to divide a program's functions into those which are "mainline" and those which are not. Mainline functions are the essence of the program, while non-mainline functions are those ancilliary actions which facilitate or complement the mainline actions. In a high-performance program, the mainline actions are typically executed repetitively or are time-critical, so that it is essential that actions which are expensive in terms of CPU time or CPU resources be avoided or moved to non-mainline functions. In general, extrinsic serialization mechanisms in the mainline can be expensive and should be avoided.

Resources and Buffers: A program typically performs one or more specialized repetitive functions and may require resources to perform those functions or to represent objects associated with them. The program may acquire storage for such resources, and collect that storage together into what is commonly called a "resource pool". In creating resource pools, programs in multiprocessing environments must be able to serialize access to the individual resources in the pool. Furthermore, programs usually need to dynamically "expand" and "contract" the pool—i.e. to increase or decrease the number of resources in the pool.

The following discussion describes the need for resource pooling in a specific example and also discusses some of the issues that arise in managing the pool. Suppose a program ("the receiver") gets data that is generated by another program ("the sender"). The receiver may acquire a piece of storage to hold data from the sender. Each piece of computer storage used for this purpose is usually called a "buffer", and is a type of resource as that term is used herein.

Data is placed into buffers as it arrives, and held there until it can be used. When the receiver has used the data in the buffer, it can receive more data for processing. Once used, the buffer is available for reuse in receiving new data.

If data can be received faster than can be processed, a number of buffers may be acquired ahead of time. The program usually organizes the buffers into a logical structure called a "buffer pool"—i.e. a resource pool. In a multiprocessing environment, the buffer pool can be used by any of the processes belonging to the program and the program must control the way in which its processes use the buffers in the buffer pool. Usually, the program will provide a way for processes to "get" and "free" buffers from the buffer pool in such a way that no two processes will get the same buffer at the same time.

In addition to controlling access to the buffers in the buffer pool, the program must also decide how many buffers to include in the buffer pool. If too few buffers are included in the buffer pool, the program may run out of buffers. The programmer may attempt to avoid this problem by determining the maximum number of buffers the program is expected to use. If the program usually only uses a small percentage of that number, then by allocating a buffer pool of the maximum size the program unnecessarily reserves computer storage that could be used instead by other programs. However, if the expected maximum size of the buffer pool is too small, the program will run out of buffers.

If the program runs out of buffers when one of its processes has data to store, the process cannot function normally and the program must take immediate action. The program might, for example, terminate execution. This "solution" is unacceptable in the great majority of cases, where continuing program execution is vital to the operation of a company or other enterprise. The program might instead throw away the process' data. However, if the data cannot be regenerated or reproduced, or is otherwise vital to the enterprise, then this solution too is unacceptable.

The program could wait until a buffer becomes available for storage. This might done where another process is using data from a buffer in parallel with the process needing the buffer for storage, and is expected to finish soon, freeing it. If this approach is taken, all processes needing buffers for storage will have to wait until the termination of a process using data from a buffer. However, if those processes using data are themselves waiting for action by processes awaiting storage buffers, the program will be "deadlocked"—unable to perform further work. For this reason, waiting for other processes to free up buffers for reuse is not acceptable.

DESCRIPTION OF THE PRIOR ART

IBM publication GC28-1154, MVS/Extended Architecture Supervisor Services and Macro Instructions, describes creation, allocation, expansion, and deletion of cell pools. Contraction of the cell pool is not described.

Call et al., U.S. Pat. No. 4,158,235, "Multi port Time-shared Associative Buffer Storage Pool," issued June 12, 1979 and assigned to Burroughs Corporation, describes dynamic assignment of buffers from the buffer pool, but does not address expansion and contraction of the pool.

Sacco et al., U.S. Pat. No. 4,422,145, "Thrashing Reduction in Demand Accessing of a Data Base Through an LRU Paging Buffer Pool," issued Dec. 20, 1983 and assigned to IBM, also describes a method of allocating and using buffers without addressing the expansion or contraction of buffer pools.

Masui et al., U.S. Pat. No. 4,727,487, "Resource Allocation Method in a Computer System," issued Feb. 23, 1988 and assigned to Hitachi, Ltd., describes resource allocation methods based on stored experimental knowledge. Masui discusses resource allocation in a machine room/operating environment, proposing a method for replacing some knowledge currently known only by the (human) system operator. Col. 4, line 67, through col. 5, line 2, states that such knowledge "is too complex and ambiguous to be formulated as a model for mathematical optimization or linear programming."

Another class of resource pool managers uses extrinsic serialization mechanisms, typically latches, to ensure that only one process at a time will refer to or modify the manager's control area where the resource pool is defined. This type of serialization allows processes to reference the control areas without concern for other processes, thus allowing pool contraction and similar activities to be performed in a relatively straightforward manner. However, this alternative approach suffers from several disadvantages of using extrinsic serialization mechanisms, particularly the wasted processor time incurred by spin latches and the additional instruction overhead incurred by suspend latches. Furthermore, where there are conflicting processes the processor instruction cost increases dramatically. Finally, serialization (both extrinsic and intrinsic) by its very nature inhibits the use of parallel processing, which is increasingly being used to increase computers' performance.

Thus, there is a need for a method for both expanding and contracting resource pools (such as buffer pools) dynamically. This method must meet the resource requirements of processes executing concurrently in a multi-processing system, and should minimize its use of serialization.

SUMMARY OF THE INVENTION

This invention comprises a computer-implemented method for expanding and contracting a master pool of discrete resources in a computerized data processing system. The master pool is expanded by creating an extension pool containing at least one additional resource, and adding the extension pool's resource(s) to the master pool. The master pool is contracted by first transferring from the master pool to the extension pool any unallocated resource(s) originating in the extension pool. Then, as resources originating in the extension pool are deallocated (such as when they are no longer in use), those resources are transferred to the extension pool. When the extension pool contains all of the resources originating in it, i.e. when none of its resources remain allocated or in use, it may be deleted. The contraction of the resource pool is preferably serialized intrinsically, such as by an atomic instruction, although the method can be effectively used using extrinsic or other serialization.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 shows the data structures for control of the buffer pools of FIG. 1.

FIGS. 4A and 4B show a pseudocode program BUILD_POOL for building a buffer pool.

FIG. 5 shows a pseudocode program GET_BUFFER for getting (allocating) a buffer from a buffer pool.

FIG. 6 shows a pseudocode program FREE_BUFFER for deallocating a buffer and returning it to the master pool or its extension pool.

FIG. 7 shows a pseudocode program FREE_POOL for freeing a extension pool.

FIGS. 8A and 8B show a pseudocode program FLUSH_MASTER_POOL for flushing an extension pool's buffers from the master pool.

FIG. 9 shows a pseudocode program DELETE_POOL for deleting an extension pool.

FIG. 10 shows a pseudocode program ADD_POOL for the basic (atomic) operation of adding a pool control element to a list thereof.

FIG. 11 shows a pseudocode program REMOVE_POOL for the basic operation of removing a pool control element from a list thereof.

FIG. 12 shows a pseudocode program UNCHAIN_POOL for the basic operation of unchaining a pool control element from a list thereof.

FIGS. 13A and 13B show pseudocode programs for the basic operations ADD_BUFFER etc. for adding a buffer control element to a list thereof.

FIGS. 14A and 14B show pseudocode programs for the basic operations REMOVE_BUFFER etc. for removing a buffer control element from a list thereof.

DESCRIPTION OF THE PREFERRED EMBODIMENT

Overview

The preferred embodiment of this invention is a method used by programs to manage a pool of resources in a multiprogramming or multiprocessing environment. It expands and contracts the resource pool without making the mainline use of the resources inefficient, and without requiring the use of latches or other extrinsic serialization mechanisms in the mainline. Thus, this method can be used by high-performance programs that must be able to operate efficiently, and by programs that must be able to get and free resources when executing in disabled mode (i.e. when they cannot be interrupted).

Where the resources are buffers, most programs reduce the cost (in time and in the number of instructions executed) of acquiring storage for the buffer pool by getting a large piece of storage and subdividing it into buffers. This is less expensive than making a separate system call for each buffer in the buffer pool, and is used both to initially create the buffer pool and to later expand the pool.

If a program acquires a piece of storage from the system it should return the entire piece at one time, since releasing the storage in portions is expensive, both in time and in instructions executed. Additionally, piecemeal release of storage may cause the system's storage to become fragmented.

Finally, the program must be careful to release buffer storage only if no processes are using any of the buffers in that storage. This is because an attempt by a process to use storage that has already been released can cause the process to terminate abnormally or experience an error condition.

Figure 1:
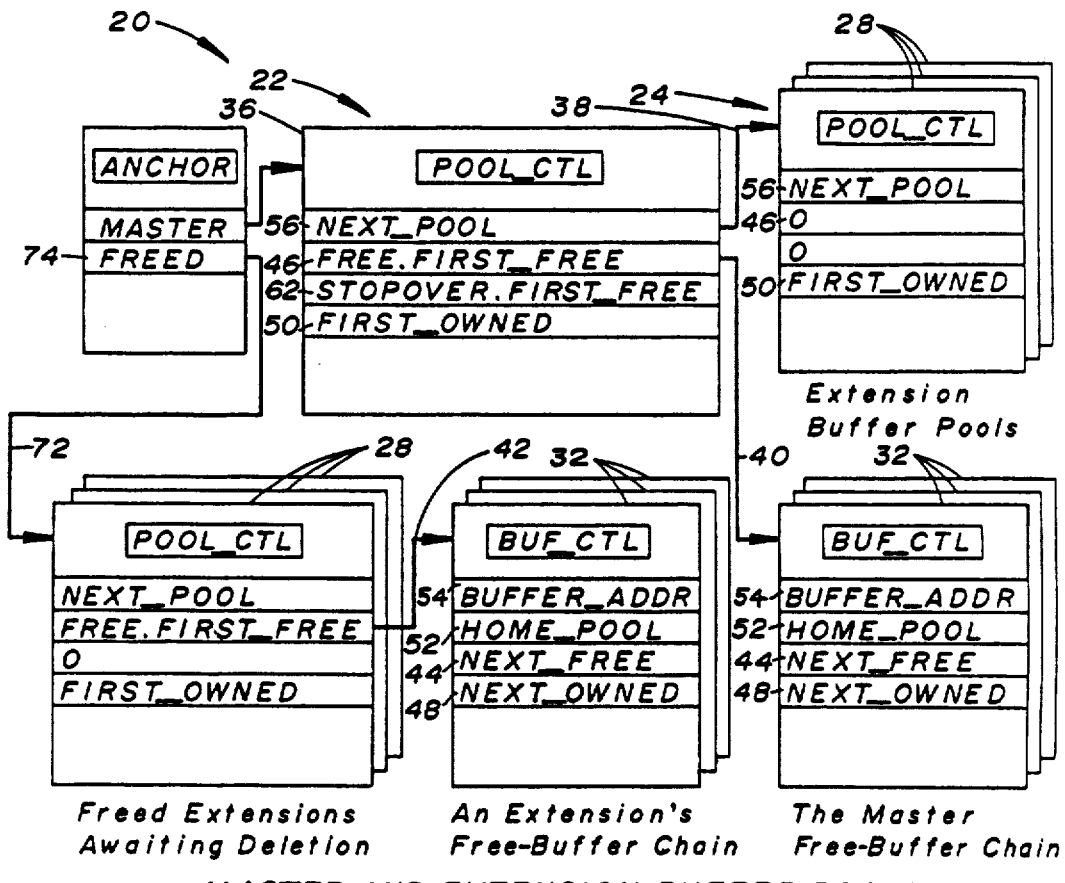
FIG. 1 is a block diagram showing a buffer pool chain having a master pool, active extension pools in use, and freed extension pools awaiting deletion, according to the preferred embodiment of this invention.

As shown in FIG. 1, a buffer pool 20 is organized into a master pool 22 and a set of extension pools 24 which may be added to the master pool at any time. The master pool 22 may be thought of as a tray containing a set of labelled boxes (resources, such as buffers). Each extension pool 24 may be thought of as an additional tray of labelled boxes. The resource pool is expanded by creating an extension tray and stacking all of its boxes on the master tray.

Each box is labelled to show which tray it is owned by, and that it should be returned to the master tray after it is finished being used. All boxes are stacked neatly in the master tray, where they can be gotten and used by the processes of the main program. The boxes in the master tray can be stacked as high as necessary to accommodate the additions.

A process which needs a box gets it from the master tray, and can use it immediately.

Boxes must be returned to the master tray (freed) before other processes can reuse them. To do this, the process which was using the box reads the label on the box and, based on what the label says, returns the box to its proper tray.

When the master tray holds more boxes than are needed by the main program's processes, the resource pool is reduced (contracted) dynamically (at that moment) by selecting one of the extension trays for removal (freeing). All of the boxes owned by that tray are relabelled, even if some of them are being used. Then the master tray is searched for boxes owned by the extension tray being removed (freed), and if any are found they are stacked on the extension tray. If any of that tray's boxes are still being used, their new labels will tell their respective processes to return them to the extension tray when they are done with them.

Once an extension tray which has been selected for removal contains all of its boxes, it and all its boxes are deleted, thereby reducing the number of boxes (resources) in the resource pool.

Since operations are provided for both dynamically expanding and contracting the resource pool, this method avoids the limitations and inefficiencies of other resource management techniques which require the main program to be stopped and reset in order to change the size of the resource pool. This method allocates an initial resource pool size based on expected or usual processing requirements, and adapts to changing conditions by dynamically allocating additional resources and deallocating unneeded ones.

Most importantly, this method contracts the resource pool in multiprogramming and multiprocessing environments without affecting mainline processing. This is done by avoiding extrinsic serialization mechanisms in the get and free operations, thereby avoiding the expense of busy waits and suspensions in the mainline logic path. As a consequence, this method is highly efficient, and can also be used by disabled processes.

It is still possible for a program using this method to run out of resources. For example, it may use more resources than are available on the computer, or it may miscalculate how many additional resources it requires. Such situations must be handled as exceptions, and are outside the scope of this method.

In addition, this method does not address the problem of resource shortages caused by inequitable utilization of a shared facility. For example, a program sending data to another program may overrun the receiver's buffer pool. Such situations must be handled using methods of congestion control, and are also outside the scope of this invention.

BASIC OPERATIONS ON BUFFERS AND BUFFER POOLS

The preferred embodiment of this invention provides operations for manipulating buffer pools and individual buffers. However, it is understood that this invention is applicable to any set of homogeneous resources.

The first section which follows describes an appropriate organization for the buffer pool. This is followed by sections which describe the operations on the buffers and pools. BUILD_POOL creates an extension pool of buffers by acquiring physical resources from the system, thereby expanding the overall resource pool. GET_BUFFER acquires a single buffer from the pool for use by the requesting process. FREE_BUFFER returns to the buffer pool a single specific buffer obtained by a previous GET_BUFFER request. FREE_POOL frees an extension pool of buffers, some of which may still be in use. DELETE_POOL deletes a freed extension pool once all of its buffers have been freed and returned to that pool, thereby contracting the overall resource pool.

The GET_BUFFER and FREE_BUFFER operations, which get and free individual buffers, are mainline operations. The remaining operations, all of which operating on buffer pools, are not mainline.

ORGANIZATION OF BUFFER POOLS

There are two types of buffer pools: master pools 22 and extension pools 24. Each buffer pool, regardless of type, has three components: a pool control element, one or more buffers, and a buffer control element for each buffer. A buffer can be associated with two buffer pools at one time—its owner pool and its home pool—and can be in either of two states—busy and free.

Figure 2:
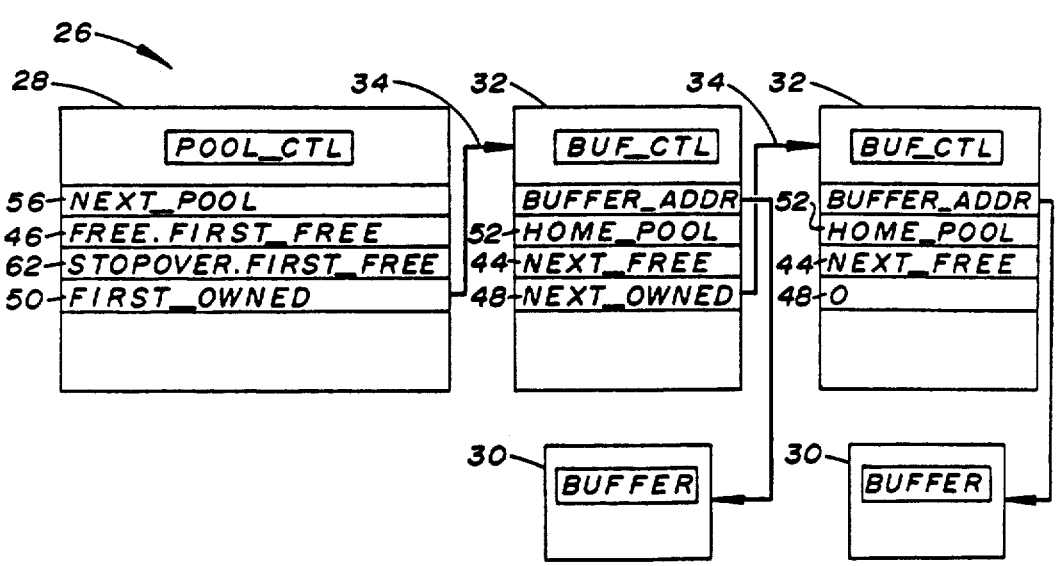
FIG. 2 is a block diagram showing a typical one of the buffer pools of FIG. 1.

As seen in FIG. 2, each buffer pool 26, regardless of type, has three components: a "pool control element" 28, one or more buffers 30, and a "buffer control element" 32 for each buffer. The number of buffers 30, and thus of buffer control elements 32, is specified when the buffer pool 26 is allocated. Each buffer 30 is said to be "owned" by its pool's pool control element 28. All buffer control elements 32 owned by a given pool 26 are listed on a chained "owned buffer list" 34. The pool's buffer control elements 32 are thus always locatable from its pool control element 28. As will be seen below, each buffer control element 32 also contains the address of some pool control element 28, called its "home". This home address for a buffer may or may not be its owning buffer pool 26.

The first buffer pool 26 built is the master buffer pool 22, and its pool control element 28 is known as the "master pool control element" 36. If the main program requires additional buffers, it may create "extension buffer pools" by performing a BUILD_POOL operation. The pool control elements 28 of the extension buffer pools 24 are organized into a chained "extension pool list" 38 anchored on the master pool control element 36.

The home for extension buffers is normally the master buffer pool 22. This has the effect of expanding the buffer pool 20 by increasing the number of buffers 30 available in the master pool 22 from which buffers are taken and returned by processes needing to use them. When an extension pool 24 is freed, the home addresses of its buffers 30 are changed from the master pool 22 to the freed extension pool 24, i.e. to the buffers' owning buffer pool.

Buffers 30 not being used by processes are kept in the master pool 22, and are considered to be in the "free" state. These free buffers may be owned by either the master pool 22 or an extension pool 24, but all maintain the master pool as their home address. The free buffers' control elements 32 are kept in a chained free buffer list 40 anchored on the master pool control element 36. Each extension pool 24 has a similarly chained free buffer list 42, but it is empty and remains so until the pool is free by the FREE_POOL operation.

When a process needs a buffer 30 it performs a GET_BUFFER operation 60, which removes the first buffer control element 32 from the master pool's free buffer list 40, and makes the associated buffer 30 available to the requesting process. The associated buffer is then said to be "busy".

When the process is finished with the buffer 30 the FREE_BUFFER operation 64 is used to re-queue the associated buffer control element 32 onto the free buffer list belonging to the buffer's home pool. Normally buffers are returned to the master's free buffer list 40. However, if the buffer's owning pool is a freed extension pool 24, the buffer's home address will have been changed and the buffer will be returned to the free buffer list 42 of that freed extension pool 24 instead of to the master pool 22. Then, once all of that freed extension pool's buffers have been returned to its free buffer list 42, the pool 24 can be physically released by a DELETE_POOL operation, thereby contracting the overall buffer pool 20.

FIG. 3 shows the data structure of the pool control elements 28 and the buffer control elements 32. The same format is used for the pool control elements of both the master pool 22 and the extension pools 24, although this is not necessary to the use of this invention.

Having described the organization and data structures of this method's buffer pools, the following sections provide further details of the operations performed on these structures, and on how these operations may be performed dynamically without requiring latches in the mainline operations of the method.

Building a Buffer Pool—BUILD_POOL 58a,58b

A buffer pool is created (built) by means of the BUILD_POOL operation 58a,58b, which must be requested by the main program before any buffers may be used. The same operation (BUILD_POOL) is used to build both the master pool 22 and the extension pools 24, the slight differences in their construction being handled within BUILD_POOL. Both BUILD_POOL 58a,58b and FREE_POOL 66 are assumed to be infrequent operations, and are therefore not mainline functions.

The master pool 22 is built before any extension pools 24 can be built. It must be identified in the BUILD_POOL request and, once built, is never removed by means of a FREE-POOL operation. The master pool 22 serves as an anchor for all buffer and buffer pool manipulation.

When the master pool 22 is built, storage is allocated and formatted for the master pool control element POOL_CTL 36, buffer control elements BUF_CTL 32, and buffers 30. The individual buffer control elements BUF_CTL 32 are chained together into the master free buffer list 40 using the NEXT_FREE field 44 of each buffer control element BUF_CTL 32. The head of this list 40 is stored in the FREE.FIRST_FREE field 46 of the master pool control element 36. The number of busy buffers, which is initially zero, is stored in the FREE.BUSY_CT field of the master pool control element 36.

The list of buffers owned by the master pool 22 is built similarly to the master pool free buffer list 40. The owned buffer list 34 is chained using the NEXT_OWNED field 48 of the pool's buffer control elements BUF_CTL 32, with the list head being stored in the FIRST_OWNED field 50 of the master pool control element 36.

The home address of each buffer is stored in the HOME_POOL field 52 of the buffer's control element BUF_CTL 32, and is initially set to the address of the master pool control element 36 as described above. The BUFFER_ADDR field 54 of each buffer control element 32 is set to the address of the element's associated buffer 30.

Finally, the address of the master pool control element 36 is stored in the ANCHOR.MASTER field for use by subsequent operations on buffer pools or buffers.

When BUILD_POOL is requested to build extension buffer pools, a data structure is built similar to that described above for the master pool control element 36. However, after the buffer control elements 32 are linked to form the pool's free buffer list 42, that list is transferred in a single atomic operation to the master pool control element's free-buffer list 40 using the Compare-Double-and-Swap instruction.

The home addresses for the buffers of these extension pools 24, again stored in the HOME_POOL field of the buffer control elements 32, are set to the address of the master pool control element 36. The extension pool's busy count BUSY_CT is set to the number of buffers in the pool, indicating that none of the pool's buffers are free (see above re freeing and deletion of extension pools).

The extension's pool control element 28 is added to the head of the extension pool list 38. This list is chained through the NEXT_POOL field 56 of the extension pool control elements 28, and its head is located in the NEXT_POOL field 56 of the master pool control element 36.

The BUILD_POOL operation may be serialized to protect it from other parallel (simultaneous) BUILD_POOL and FREE_POOL processes by using an atomic instruction. Since these operations are infrequent and non-mainline, any type of extrinsic serialization, like a latch, could be used as well, and the type used is a matter of design choice.

The extension's owned buffer list is built as described above for the buffers of the master pool 22. This provides a way to locate all of the components of the extension pool directly from its pool control element 28 even if some of the buffers have been removed from the master's free buffer list 22.

In summary, the BUILD_POOL operation builds a buffer pool 26 in which the master pool control element 36 serves as an anchor for processing of the pool. The master pool control element 36 is not deleted as long as buffer services are required by the program. Processes using buffer services need never be concerned about attempting to address a buffer pool which is being concurrently deleted, because such processes never reference extension pools directly.

Pseudocode for BUILD POOL 58a,58b: FIGS. 4A and 4B show an implementation of the BUILD_POOL procedure 58a,58b in conventional pseudocode.

At lines 400-404, storage is acquired from the system and suballocated. These storage areas are assumed to be initialized to binary zeroes. Each buffer control element BUF_CTL 32 is then formatted (lines 405-416).

A buffer is allocated to each BUF_CTL element (line 407), and the home pool for each BUF_CTL element is set to the master pool control element POOL_CTL 36 (lines 407-410). At lines 411-415, the pool's owned buffer list 34 and free buffer list 42 are formed. At line 417, the owned buffer list 34 is chained to the POOL_CTL element.

If a master pool 22 was requested of the BUILD_POOL operation (rather than an extension pool), lines 418-427 are executed. First, the new pool's free buffer list 42 is added to the master's free buffer list 40 by line 420. This is done non-atomically, since no other process has access to the pool structure yet. The location of the master pool control element POOL_CTL 36 is then atomically placed in the ANCHOR.MASTER field which anchors the entire buffer pool structure. If the operation is successful, the buffer is now available to other processes that need buffer services. The BUILD_POOL request fails if another concurrent or parallel process has already placed the location of its master pool control element POOL_CTL 36 in the anchor (lines 422-426). This atomic operation can be accomplished by using an atomic instruction such as the IBM 370 Compare-and-Swap instruction. The description of this instruction, as well as sample coded applications, can be found in IBM System/370 Extended Architecture Principles of Operation (Publication Number SA22-7085).

If an extension pool was requested, lines 428-433 are executed instead of lines 418-427. First, the extension's entire free buffer list 42 is atomically added to the master pool's free buffer list 40 (line 430; see below re FIG. 13a (line 1321), leaving the extension's free buffer list 42 empty (line 431). This operation makes the extension's buffers available to other processes. The BUSY_CT field of the extension pool control element 28 is used by the FREE_POOL operation (FIG. 7, described below) to determine when the extension pool is quiesced, i.e. when all of its buffers have been freed so that the pool can be deleted. Finally, the extension pool is atomically added to the master's extension pool list 38 (line 432). This atomic operation is described in FIG. 10 (line 1005). Line 434 returns a successful completion status to the requestor which initiated the BUILD_POOL procedure 58.

Getting and Freeing Buffers—GET_BUFFER 60 and FREE_BUFFER 64

The two mainline operations are GET_BUFFER 60 and FREE_BUFFER 64. With this invention, these operations can be serialized using atomic instructions, without recourse to more expensive extrinsic serialization mechanisms such as latches which can result in suspension, busy waits, or deadlocks.

When a process requires a buffer it issues a request to execute the GET_BUFFER procedure 60. GET_BUFFER selects the buffer control element BUF_CTL 32 at the head of the master free buffer list 40, i.e. whose address is stored in the FREE.FIRST_FREE field 46 of the master pool control element 36. That buffer control element 32 is removed from the list, and the list's busy count, POOL_CTL.FREE._BUSY_CT, is incremented by one (1).

When the GET_BUFFER procedure 60 is complete, the requesting process is given a "token" which is the address of the buffer control element BUF_CTL 32 for the buffer 30. The requesting process gains access to the buffer 30 identified in the BUFFER_ADDR field of the buffer control element BUF_CTL 32 by means of this token.

No latches are used to serialize multiple processes, including those executing with interrupts disabled, seeking to acquire buffers in parallel. Instead, a simple Compare-Double-and-Swap operation on the master free buffer list 40 is sufficient to allow the head element identified in the master pool control element's FREE._FIRST_FREE field 46 to be removed safely.

A "stopover list" of buffers is also checked before GET_BUFFER 64 returns an out-of-buffer error message to the requesting process. This is because the master free buffer list 40 may be empty although the buffer pool 20 itself is not, since a FREE_POOL operation 66 (detailed below) may be underway simultaneously with a GET_BUFFER request. The stopover list is a chained list (like the free buffer lists 40,42 described above) anchored in the STOPOVER field 62 of the master pool control element 36. The FREE_POOL process attempts to remove all of the extension's buffers from the master's free list, and the stopover list is a holding area for other buffers removed during this process. Since this list is available to the GET_BUFFER function, the stopover list is a device that virtually eliminates the likelihood of reporting a false out-of-buffer condition because of FREE_POOL processing. (In fact, this case can only occur if there is exactly one buffer left on the free list and a GET_BUFFER request checks for a free buffer after it has been removed from one list and before it has been placed on the stopover list). If the master free buffer list 40 is empty, GET_BUFFER checks the STOPOVER field 62. If the stopover field 62 is not empty (indicating that there are buffers in the stopover list), GET_BUFFER removes the first buffer on the stopover list and returns its token to the requesting process. Otherwise, if both the master free buffer list 40 and the stopover list are empty, then the buffer pool 20 is in fact out of buffers 30 and signals an "out-of-buffer" error condition. It is still possible, but highly unlikely, that GET_BUFFER will incorrectly report that the buffer pool 20 is out of buffers.

When a process wishes to return a buffer 30 to the buffer pool 20, it must execute the FREE_BUFFER procedure 64, specifying the token (described above) associated with the buffer. FREE_BUFFER adds the buffer's control element 32 to the head of the free buffer list of the buffer's home pool and decrements that pool's free buffer busy count FREE.BUSY_CT by one (1). In particular, the address of the buffer control element BUF_CTL 32 identified by the token is placed in the FREE.FIRST_FREE field 46 of the pool control element 28 of the pool (master 22 or extension 24) specified by the HOME_POOL field 52 of the buffer control element.

A simple atomic operation such as Compare-Double-and-Swap is sufficient to serialize this mainline FREE_BUFFER procedure 64, just as described above for the GET_BUFFER procedure 60. No extrinsic serialization such as latches is required. This Compare-Double-and-Swap intrinsic serialization makes the mainline GET_BUFFER and FREE_BUFFER operations fast and efficient. Moreover, GET_BUFFER and FREE_BUFFER support dynamic buffer pool expansion and contraction without latches—the only cost for this capability being a check of the stopover list's STOPOVER field 62 when the master free buffer list 40 appears to be empty. In most cases, then, this method adds no additional instructions to mainline processes using buffer services.

Pseudocode for GET BUFFER 60: FIG. 5 shows an implementation of the GET_BUFFER procedure 60 in conventional pseudocode.

At line 500, the address of the master pool 22 obtained. The master pool is never deleted as long as any processes require buffer services so this is a safe reference.

The first buffer control element BUF_CTL 32 in the master free buffer list 40 is atomically removed and the busy count incremented at line 501, which calls the REMOVE_BUFFER_AND_COUNT procedure shown in FIGS. 14A and 14B. Line 501 is considered the normal execution path of the GET_BUFFER procedure 60, since there should normally be a buffer on the master free buffer list 40. A successful completion status is returned to the requesting process together with the location (token) of the allocated buffer's control element BUF_CTL 32 (line 503).

If the master free buffer list 40 is empty (line 504), then GET_BUFFER attempts to remove a buffer control element BUF_CTL 32 from the STOPOVER field 62 of the stopover list (line 506), again using the REMOVE_BUFFER_AND_COUNT procedure 66 of FIGS. 14A and 14B. This will happen only rarely: when the buffer pool 20 is truly out of buffers, or when a FREE_POOL operation has flushed all buffers to the stopover list. If a FREE_POOL operation is in progress and a buffer can be allocated to the requesting process from the stopover list, then a token for that buffer's control element BUF_CTL 32 and a successful completion status code are returned to the requestor (line 508).

If the stopover list is also empty (line 509), GET_BUFFER will indicate to the requesting process that no buffers are currently available (line 510).

Pseudocode for FREE BUFFER 64: FIG. 6 shows an implementation of the FREE_BUFFER procedure 64 in conventional pseudocode.

At line 600, the pool control element POOL_CTL 28 of the home pool of the buffer 30 being freed is obtained from the HOME_POOL field 52 of the buffer's control element BUF_CTL 32. If the buffer 30 is associated with an extension pool 24 which is in the process of being freed by a FREE_POOL operation 66, the POOL_CTL element 28 obtained by line 600 is that of the extension pool which owns the buffer. If the buffer's owning pool is not being freed, its home pool is the master pool 22, and the master pool control element POOL_CTL 36 will be obtained by line 600.

At line 601, the BUF_CTL element 32 is atomically placed at the head (FREE.FIRST_FREE 46) of the free buffer list of the buffer's home pool, and the home pool's free buffer busy count FREE.BUSY_CT is decremented by one (1). This processing is done by the ADD_BUFFER_AND_COUNT operation shown in FIGS. 13A and 13B and described below.

A buffer 30 owned by a freed extension pool 24 may be returned to the master pool 22 instead of the extension. This can happen if the FREE_BUFFER operation 64 is interrupted (temporarily postponed) after it has determined to which POOL_CTL element 28, 36 the buffer is to be returned. If a FREE_POOL operation 66 is then performed, FREE_POOL will free the POOL_CTL element. Then, when the FREE_BUFFER operation is resumed, it will return the buffer to the master free buffer list 40. If that buffer were never removed from the master list 40, it would prevent the freed extension pool 24 which owned it from being deleted. This unlikely occurrence is handled by lines 916-920 of the DELETE_POOL procedure of FIG. 9.

Freeing a Buffer Pool—FREE_POOL 66

If a program no longer requires the use of some of the buffers added to a dynamically expanded buffer pool 20, it uses the FREE_POOL procedure 66 to contract the pool. The FREE_POOL operation 66 starts a potentially two-stage process which eventually results in the deletion of an extension buffer pool 24, even if buffers 30 owned by that pool are in use by other processes when the request is issued.

In the first stage of dynamic buffer pool contraction, the FREE_POOL procedure 66 selects the most recently built extension pool 24 and makes its buffers 30 unavailable to further GET_BUFFER requests. If no buffers belonging to the freed buffer pool are in use by other processes, the pool is deleted immediately. Otherwise the FREE_POOL operation 66 terminates, leaving deletion of the free extension pool 24 to the second stage.

In the second stage, the DELETE_POOL procedure 68 deletes the freed extension pool 24 once all its buffers 30 have been freed by the processes which were using them. DELETE_POOL is described below with reference to FIG. 9.

FREE_POOL 68 removes the first extension pool 24 from the master extension pool list 38. That extension pool is identified in the NEXT_POOL field 56 of the master pool control element POOL_CTL 36. The individual buffer control elements BUF_CTL 32 of the pool 24 being freed are identified using the pool's owned buffer list 34, which is anchored in the FIRST_OWNED field 50 of the pool's control element POOL_CTL 36.

The address of the home pool, HOME_POOL 52, of each buffer control element BUF_CTL 32 is changed from the master pool control element 36 to the pool control element POOL_CTL 28 of the extension pool being freed. Buffers freed by a FREE_BUFFER request will now be returned to the extension pool's free buffer list 42 (see line 600 of FIG. 6), and once placed there they are no longer accessible to GET_BUFFER requests. When all of its buffers have been returned to its free buffer list 42, the extension pool 24 itself is said to be "quiesced" and may be deleted safely without impact to concurrent processes. This deletion is done immediately by lines 707-709a of FREE_POOL 66, or by the DELETE_POOL procedure 68.

Some of the buffers 30 owned by the freed pool 24 may be in use by processes when the FREE_POOL operation 66 is executed. These buffers will be returned to the extension pool 24 when they are freed by the FREE_BUFFER procedure (line 601 of FIG. 6). The extension's remaining buffers are on the master free buffer list 40, and would not normally be returned to the free extension pool 24 until they had been gotten by other processes, used, and freed.

Rather than relying on other processes to get and free these remaining buffers in the course of their normal processing, the FLUSH_MASTER_POOL procedure 70a, 70b ensures that the freed pool 24 will quiesce by "flushing" the master pool's unused buffers. FLUSH_MASTER_POOL 70a, 70b transfers buffers from the master free buffer list 40 onto the master's stopover list, and from there either to the freed pool's free buffer list 42 or back to the master free buffer list 40. FLUSH_MASTER_POOL 70a, 70b uses only Compare-Double-and-Swap instructions, avoiding extrinsic serialization.

The first step in flushing the master pool 22 removes the buffer control element BUF_CTL 32 at the head of the master free buffer list 40 using Compare-Double-and-Swap logic, and increments the master pool's busy count, FREE.BUSY_CT, by one (1). Second, if that buffer's home pool is the extension pool 24 being freed, the buffer's control element BUF_CTL 32 is added to the head of the freed extension's free buffer list 42 (again using Compare-Double-and-Swap), and that extension pool's busy count, FREE.BUSY_CT, is decremented by one (1). However, if that buffer's home is the master pool 22, its buffer control element BUF_CTL 32 is added to the head of the master pool's stopover list (i.e. to the STOPOVER.FIRST_FREE field 62) using Compare-Double-and-Swap, without altering STOPOVER.BUSY_CT.

These three steps are repeated until the freed extension pool's busy count is zero (0), or until the master free buffer list 40 is empty. Then the buffers on the master's stopover list are returned to the master free buffer list 40 so they can be allocated to processes for use. However, the buffers on the stopover list cannot be returned en masse, since removing the entire list creates a brief interval (a window) during which it may appear that the buffer pool 20 is empty when in fact it is not. Instead, the stopover list's buffers are returned one at a time, serialized by Compare-Double-and-Swap logic. Also, some additional bookkeeping is required to ensure that the master pool's busy count BUSY_CT accurately reflects the number of buffers allocated to processes.

If its buffers 30 have all been returned, the freed extension pool 24 is deleted immediately by FREE_POOL 66 during the first stage of dynamic contraction, and a second stage is not needed. Otherwise, the freed pool's control element POOL_CTL 28 is added to the head (the FREED field 74 in the anchor structure) of the freed pool list 72, and the pool 24 is allowed to quiesce. The addition of a pool control element POOL_CTL 28 to the freed pool list 72 must be serialized (say, by an atomic instruction), since another FREE_POOL process or a concurrent DELETE_POOL process for previously freed pools may be in progress.

The freed pool list 72 keeps track of freed extension pools 24 which cannot yet be physically deleted, allowing the FREE_POOL operation 66 to be performed at any time. Processes already using buffers 30 from the freed pool 24 can continue to do so undisturbed, since the physical storage associated with that buffer's pool cannot be released until all buffers associated with the pool are freed.

The FLUSH_MASTER_POOL 70a,70b operation is serialized to prevent it from being executed concurrently by two parallel processes. If this is not done, one FLUSH_MASTER_POOL process could be removing buffers from the master free buffer list 40 list and placing them on the stopover list, while the other FREE_BUFFER process is returning buffers in the other direction (from the stopover list to the master free buffer list 40). Although the likelihood of this occurring is very small, it could cause the two processes to be interlocked in a neverending sequence of instructions—an "infinite loop". This possibility is eliminated in our method by using a latch (the FREE_POOL latch) to protect the logic that moves buffers between the master pool's free buffer list 40 and stopover list.

Pseudocode for FREE POOL 66: FIG. 7 shows an implementation of the FREE_POOL procedure 66 in conventional pseudocode.

At line 700, the first extension pool control element POOL_CTL 28 is removed from the master pool's extension pool list 38 (NEXT_EXT). This is done by the REMOVE_POOL procedure 75 shown in FIG. 11, and is done atomically, since a concurrent BUILD_POOL or FREE_POOL operation may be manipulating the extension pool list 38.

If a pool control element POOL_CTL 28 was removed (line 701), then the associated extension pool 24 will be freed. First, the pool's owned buffer list 34 is scanned to reset each extension buffer's home pool stored in the HOME_POOL fields 52 (lines 703–705). Next, the extension's buffers are removed from the master free buffer list 40 (line 706) using the FLUSH_MASTER_POOL 70a,70b procedure of FIGS. 8A and 8B.

If the extension pool 24 is quiesced (lines 707–709a), the pool's buffers 30 are released, physically deleting them and thereby contracting the buffer pool 20. In this case, the master pool's busy count BUSY_CT is reduced by the number of buffers that user processes removed from the master free buffer list 40 but returned to the free extension pool's free buffer list 42.

If the freed pool 24 is not quiesced (lines 710–711), its POOL_CTL element 28 is queued on the freed pool list 72 using the ADD_POOL procedure 76 described below with reference to FIG. 10. ADD_POOL uses an atomic operation to serialize against concurrent DELETE_POOL and FREE_POOL processes.

Pseudocode for FLUSH MASTER POOL 70a,70b: FIGS. 8A and 8B show an implementation of the FLUSH_MASTER_POOL procedure 70a,70b in conventional pseudocode. FLUSH_MASTER_POOL is used by FREE_POOL and DELETE_POOL procedures to remove all of a freed extension pool's buffers from the master free buffer list 40.

A latch is acquired (line 801) to serialize the FLUSH_MASTER_POOL procedure 70a,70b against concurrent FREE_POOL and DELETE_POOL operations. Otherwise, one FREE_POOL process executing the remove loop (lines 802–817) may interfere with another FREE_POOL process executing the return loop (lines 818–825). Although this is an unlikely possibility, the latch protects the operation against a never-terminating loop.

The remove loop (lines 802–817) removes buffers atomically from the master free buffer list 40 (line 804), and returns them either to the freed extension pool's free buffer list (line 808) or to the master pool's stopover list (line 810). The remove loop (lines 802–817) terminates when there are no more buffers in the master free buffer list 40.

If a pool control element POOL_CTL 28 is passed to the FLUSH_MASTER_POOL procedure, the remove loop (lines 802–817) also terminates if the given POOL_CTL element's BUSY_CT is zero (lines 814–816), since the zero value indicates that the specified control element's extension pool 24 is quiesced.

The remove loop uses the REMOVE_BUFFER_AND_COUNT procedure 78a,78b of FIGS. 14A and 14B to remove buffers from the master free buffer list 40 atomically and increment the master pool's busy count BUSY_CT by one (1) for each buffer removed (line 804). Line 808 uses the ADD_BUFFER_AND_COUNT procedure 80a of FIG. 13A to return buffers to the extension's free buffer list 42 atomically and decrement the extension pool's busy count BUSY_CT by one (1), so that when the pool has quiesced its busy count is equal to zero (0). Line 810 uses the ADD_BUFFER procedure 82 of FIG. 13A to add buffers to the master pool's stopover list atomically. The stopover busy count is not updated by ADD_BUFFER, since it does not contain a meaningful number.

After the remove loop of lines 802–817 is completed, the buffers on the master pool's stopover list are then returned to the master free buffer list 40 by lines 818–825. The REMOVE_BUFFER procedure 86 of FIG. 14A removes buffers from the stopover list atomically without updating the busy count (line 820), and the ADD_BUFFER_AND_COUNT procedure 80 adds those buffers to the master free buffer list 40. The return loop is terminated (line 824) when the stopover list is empty. The latch acquired by line 801 is released by line 826 as soon as the remove loop is done.

To ensure that the master pool's busy count BUSY_CT is accurate, the number of buffers removed atomically from the master free buffer list 40 by FLUSH_MASTER_POOL's remove loop is subtracted from the master pool's busy count BUSY_CT by line 827, preferably using a Compare-and-Swap instruction for serialization. The number of extension buffers removed from the master free list is added to the extension POOL_CTL.FLUSH_CT and is used by free pool and delete pool.

Deleting a Buffer Pool—DELETE_POOL 68

DELETE_POOL 68 implements the second stage of dynamic contraction of the buffer pool 20 for freed extension pools 24 which could not be deleted at the time of the FREE_POOL operation 66. A single timer-driven process independently removes such pools from the freed pool list 72 and releases their storage when all of their associated buffers have been freed.

DELETE_POOL 68 is responsible for monitoring freed pools 24 and for detecting quiesced freed pools. At each timer interval, DELETE_POOL scans the freed pool list 72 for pools whose busy count BUSY_CT is zero (0). If one such is found anywhere in the list, DELETE_POOL removes it using Compare-and-Swap logic, and releases the physical storage associated with the pool so as to contract the buffer pool 20.

Access to the freed pool list 72, anchored in the FREED field 74, is intrinsically serialized by the careful use of atomic instructions. While multiple FREE_POOL processes may be adding extension pools to the head of the list, only one DELETE_POOL process can remove them. Since there is only one DELETE_POOL process, atomic instructions can be used to remove a pool control elements 28 anywhere in the list. Furthermore, the DELETE_POOL operation 68 does not conflict with mainline processes of the main program, since the operation is only performed if a freed pool 24 is completely quiesced.

The DELETE_POOL operation 68 checks for extension pools 24 that have been freed, but that have not quiesced in a timely fashion. Usually this happens when a user process has gotten a buffer 30 and has not yet returned (freed) it. In rare cases, however, this may occur because a buffer belonging to a freed extension has been returned to the master pool's free buffer list 40 instead of the extension's free buffer list 42. As noted above, this can only happen if the FREE_BUFFER operation 64 is interrupted after it decides to return the buffer to the master free buffer list 40. If a FREE_POOL operation 66 is executed at that point, the pool will be freed and set aside to quiesce. Meanwhile, the FREE_BUFFER operation, when resumed, will return the buffer to the master free buffer list 40. If the buffer is not subsequently removed by a user process or another FREE_POOL operation, the freed pool will never quiesce. DELETE_POOL 68 handles this situation by periodically flushing such buffers off the master free buffer list 40.

Pseudocode for DELETE_POOL 68: FIG. 9 shows an implementation of the DELETE_POOL procedure 68 in conventional pseudocode.

Line 901 of DELETE_POOL 68 causes the operation to be executed periodically, using a timer. Line 902 scans the entire freed pool list 72 for quiesced pools.

Because DELETE_POOL 68 is the only process which removes POOL_CTL elements from the freed extension list 72, standard techniques for manipulating queues can be used to remove a freed extension pool control elements POOL_CTL 28 anywhere from the list of such elements.

If the extension pool 24 associated with a POOL_CTL element 28 on the freed pool list 72 is quiesced, that POOL_CTL element can be removed (unchained) from the list atomically (lines 906-909). The pool's resources are released (line 912), and the master pool's busy count is adjusted by the number of buffers that user processes removed from the master free buffer list 40 but returned to the freed extension pool's free buffer list 42 (line 913). This adjustment cannot be made until the pool is quiesced because it is not known whether a user process will return the buffer to the master or extension free buffer list until it has actually returned the buffer.

If the UNCHAIN_POOL atomic operation of line 907 or 909 fails (tested at line 910), the entire queue is rescanned (line 911) by beginning the DELETE_POOL procedure again from line 902. This can happen if the pool control element POOL_CTL 28 of the freed pool to have been unchained and deleted is located at the head of the freed pool list 72, and a concurrently executing FREE_POOL process adds another POOL_CTL element to the head of the list.

If the freed pool 24 of a POOL_CTL element is not quiesced, no action is taken with respect to that pool in DELETE_POOL's scanning loop of lines 903-915.

As discussed above, the entire master free buffer list 40 is occasionally flushed using the FLUSH_MASTER_POOL operation 70a, 70b to remove orphaned buffers. This process is triggered by lines 916-920 of DELETE_POOL 68, but need not be performed during each timer interval. Any of a variety of schemes can be used to limit the frequency with which it is performed. In our preferred embodiment the master free buffer list 40 is flushed only after a selected number of timer intervals have elapsed. Alternatively, the quiescing pools can be aged and the master free buffer list flushed only if any "overaged" pools are encountered.

Atomic Operations

The procedures described above rely on a number of atomic operations. These are the ADD_POOL, REMOVE_POOL, UNCHAIN_POOL operations on pool control elements POOL_CTL 28, and the ADD_BUFFER_AND_COUNT, ADD_BUFFER, ADD_BUFFER_LIST, REMOVE_BUFFER, and REMOVE_BUFFER_AND_COUNT operations on buffer control elements BUF_CTL 32. All of these atomic operations are intrinsically serialized using atomic instructions, such as the IBM/370 Compare-and-Swap and Compare-Double-and-Swap instructions.

Pseudocode for ADD_POOL 76: FIG. 10 shows an implementation of the ADD_POOL procedure 76 in conventional pseudocode.

ADD_POOL 76 atomically adds a pool control element POOL_CTL 28 to a list of such elements. The list is chained through the NEXT_POOL fields 56 of the pool control elements. For a given POOL_CTL element 28 and a given list, ADD_POOL adds the element to the head of the list. The element which was previously at the head of the list is chained to the new element (line 1003) and the new element is placed at the head of the list (line 1005).

The new element is added to the list only if the current list header has not been altered by a parallel process. This atomic operation can be accomplished by using an atomic instruction such as the IBM 370 Compare-and-Swap instruction. If the atomic operation fails, ADD_POOL repeats its attempt to add the element at the head of the new list (line 1007), by retrying again from line 1002.

Pseudocode for REMOVE POOL 75: FIG. 11 shows an implementation of the REMOVE_POOL procedure 75 in conventional pseudocode. REMOVE_POOL atomically removes a pool control element POOL_CTL 28 from a list of such elements.

Lines 1100-1105 define the POOLCHAIN data type as a doubleword structure consisting of an index (line 1102) and a pointer (line 1103) to a list header. It is used as an anchor for a list of POOL_CTL elements. The POOLCHAIN index permits more than one process at a time to remove POOL_CTL elements from a list atomically (e.g., element removal by FREE_POOL from the master pool's extension pool list). If only one process at a time were able to remove elements from a list, then a pointer would be adequate as a list anchor. This pseudocode, however, is used in both FREE_POOL 66 and DELETE_POOL 68, and it is expedient to use the POOLCHAIN data type as an anchor for all lists of pool control elements POOL_CTL 28. It is not wrong to use such an anchor for the freed pool list 72; it is simply not necessary.

For a given list anchor, REMOVE_POOL 75 tries to remove the first pool control element POOL_CTL 28 on the list (line 1108) using the UNCHAIN_POOL operation 88 of FIG. 12. If it succeeds, REMOVE_POOL returns the newly unchained element to the requesting process (line 1112). If there are no elements in the list a null POOL_CTL element is returned.

If the atomic UNCHAIN_POOL operation 88 fails (line 1109), indicating that one or more concurrent processes have altered the list, REMOVE_POOL 75 repeats its attempt to remove and return the current list header, by retrying the operation (line 1110).

Pseudocode for UNCHAIN_POOL 88: FIG. 12 shows an implementation of the UNCHAIN_POOL procedure 88 in conventional pseudocode.

UNCHAIN_POOL 88 is used by REMOVE_POOL 75 to remove an element from the head of a list, and by DELETE_POOL 68 to remove elements from anywhere on a list. For this reason, the chain field is always of data type POOLCHAIN, so that the REMOVE_POOL logic can accommodate removal of elements from the list by more than one process at a time. If, however, only one process is to be allowed to remove elements from the list at a time, a simple pointer would be adequate to represent the list's chain field and anchor.

For a specified list "poolchain" including a specified pool control "element" POOL_CTL 28, UNCHAIN_POOL atomically connects the chain to the next element in the list, removing the POOL_CTL 40 element (line 1210) from the list. If there is no element chained to the chain field, a null POOL_CTL element is returned (line 1204-1205).

The element 28 is removed only if the chain field has not been altered by a parallel process. This atomic operation is accomplished using the IBM 370 Compare-Double-and-Swap instruction. If the atomic operation fails, UNCHAIN_POOL notes the failure (line 1216) and returns this indication to the requestor.

Pseudocode for ADD_BUFFER_AND_COUNT, ADD_BUFFER, and ADD_BUFFER_LIST: FIGS. 13A and 13B show an implementation in conventional pseudocode of the ADD_BUFFER_AND_COUNT, ADD_BUFFER, and ADD_BUFFER_LIST procedures 80, 82, and 84a, 84b, respectively. These operations atomically add one or more buffer control element BUF_CTL 32 to a list of such elements. The ADD_BUFFER_AND_COUNT and ADD_BUFFER procedures 80,82 both rely on the ADD_BUFFER_LIST procedure 84a, 84b. The lists used by these operations are chained through the NEXT_FREE fields 44 of the buffer control elements BUF_CTL 32.

Lines 1300-1306 of FIG. 13A define the BUF_HEADER data type, which is used as an anchor for a list of BUF_CTL elements. This is a doubleword structure consisting of a busy count "counter" (line 1304), an index (line 1303), and a list header (line 1305). BUF_CTL elements can be added or removed from the buffer list by multiple processes, but the busy count "counter" must be updated in the same atomic operation that adds or removes an element. Also in that same operation, the index must be incremented to guard against interference when concurrent processes are removing BUF_CTL elements from the list at the same time.

ADD_BUFFER_AND_COUNT (lines 1307-1309) atomically adds a single element (i.e., a one-element list) to the head of a list and decrements the BUSY_CT by one (1). ADD_BUFFER_AND_COUNT simply calls the ADD_BUFFER_LIST operation with certain parameters as shown in line 1308.

ADD_BUFFER (lines 1310-1312) atomically adds a single element (i.e., a one-element list) to the head of a list but does not update the BUSY_CT (decrements by 0). ADD_BUFFER calls the ADD_BUFFER_LIST operation with the same parameters as ADD_BUFFER_AND_COUNT (line 1311), except that it passes a zero (0) value for the integer "n" instead of the value one (1) passed by ADD_BUFFER_AND_COUNT.

ADD_BUFFER_LIST (lines 1313-1324) adds a new list of chained BUF_CTL elements to the head of an existing list. The first and last elements of the new list are passed as parameters to ADD_BUFFER_LIST. The function places the new list's first element as the new head of the existing list (line 1319, 1321). At the same time, the previous head element of the existing list is chained to the last element in the new list (line 1320).

The new list is added to the existing list only if the current header of the existing list has not been altered by a parallel process (line 1322, FIG. 13B). This is serialized using the atomic IBM 370 Compare-Double-and-Swap instruction. The same atomic operation is used to decrement the busy count BUSY_CT by the input count N (line 1318). Moreover, since more than one process may remove elements from the list, an INDEX count is also incremented in the same operation (lines 1317, 1321). If the atomic operation fails, indicating that another process changed the header of the existing list, ADD_BUFFER_LIST repeats its attempt to add the new list to the existing list (1323).

Pseudocode for REMOVE_BUFFER_AND_COUNT and REMOVE_BUFFER: FIGS. 14A and 14B show an implementation in conventional pseudocode of the REMOVE_BUFFER_AND_COUNT and REMOVE_BUFFER procedures 86 and 78a, 78b, respectively. These operations atomically remove the first buffer control element BUF_CTL 32 from a list of such elements.

REMOVE_BUFFER 86 is a function that atomically removes the first element in the specified list, but does not update the BUSY_CT (increments by O). REMOVE_BUFFER (lines 1400-1402) calls the REMOVE_BUFFER_AND_COUNT procedure operation with certain parameters, as shown by line 1401.

REMOVE_BUFFER_AND_COUNT (lines 1403-1421) atomically removes the first BUF_CTL element from a list of POOL_CTL elements. For a given list header "anchor" passed to it, REMOVE_BUFFER_AND_COUNT tries to remove the first (header) element on the list by making the next element in the list the new list header (line 1413). The old header element is removed from the list only if the current list header has not been altered by a parallel process. This is serialized by the IBM 370 Compare-Double-and-Swap instruction.

The busy count BUSY_CT is incremented in the same atomic operation by the input count N (line 1411), and since more than one process may remove elements from the list, an INDEX count is also incremented in the same operation (line 1412).

If the atomic operation fails (line 1417), REMOVE_BUFFER_AND_COUNT repeats its attempt to remove the first element from the list by retrying its procedure again (line 1418).

If there are no elements in the list, a null BUF_CTL element is returned (lines 1407-1408). Otherwise, the removed element is returned (line 1420).

It will be appreciated that, although specific embodiments of the invention have been described herein for purposes of illustration, various modifications may be made without departing from the spirit and scope of the invention. In particular, the atomic operations described may be serialized using latches or other extrinsic serialization mechanisms instead of the intrinsic serialization available through the IBM 370 Compare-and-Swap and Compare-Double-and-Swap instructions, although the system's performance could be expected to suffer.

Further, it is understood that the invention's dynamic expansion and contraction is applicable to a wide variety of resources, and is in no way limited to buffer or other storage management.

Accordingly, the scope of protection of this invention is limited only by the following claims.

We claim:

1. A method for expanding and contracting a master pool of computer resources which are allocable for use in a computerized data processing system, comprising the steps executed by the system's computer of:
   (a) expanding the master pool by
      (i) creating an extension pool containing at least one additional computer resource, and
      (ii) adding the extension pool's computer resources to the master pool; and
   (b) contracting the master pool by
      (i) transferring from the master pool to the extension pool any unallocated computer resource originating in the extension pool,
      (ii) upon the deallocation of a computer resource originating in the extension pool, transferring such computer resource to the extension pool, and
      (iii) deleting the extension pool when it contains all of the computer resources originating in it.

2. The method of claim 1, wherein the computer resources are buffers.

3. The method of claim 1, wherein at least one of the steps therein is intrinsically serialized using an atomic instruction.

4. The method of claim 3, wherein the atomic instruction is the IBM 370 Compare-Double-and-Swap instruction.

5. A method for managing the master pool of computer resources in a computerized data processing system, comprising the steps executed by the system's computer of:
   (a) creating an extension pool containing at least one additional computer resource;
   (b) chaining the extension pool's computer resources to the master resource pool;
   (c) allocating (getting) the computer resources from the master pool for use by processes executing in the system;
   (d) deallocating (freeing) the computer resources by the processes;
   (e) returning said freed computer resources belonging to an active extension pool to the master pool;
   (f) returning said freed computer resources belonging to a freed extension pool to said extension pool;
   (g) transferring any unallocated computer resource belonging to a freed extension pool from the master pool to said extension pool; and
   (h) deleting the freed extension pool when it contains all of the computer resources belonging to it.

6. The method of claim 5, wherein the steps of allocating and deallocating the computer resources are intrinsically serialized.

7. The method of claim 6, wherein the intrinsic serialization is provided by the use of an atomic instruction.

8. The method of claim 7, wherein the atomic instruction is the IBM 370 Compare-Double-and-Swap instruction.

9. The method of claim 5, wherein the master and extension pools are organized as chains of control elements.

10. The method of claim 9, wherein the computer resources are transferred between pools by heading their control elements to the destination pool's chain, and deleting said control element from the originating pool's chain.

* * * * *